(12) United States Patent
Odajima

(10) Patent No.: US 11,524,506 B2
(45) Date of Patent: Dec. 13, 2022

(54) MOBILE DEVICE AND LIQUID STORING CARTRIDGE

(71) Applicant: SEIKO EPSON CORPORATION, Tokyo (JP)

(72) Inventor: Shota Odajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 17/143,212

(22) Filed: Jan. 7, 2021

(65) Prior Publication Data

US 2021/0213756 A1 Jul. 15, 2021

(30) Foreign Application Priority Data

Jan. 9, 2020 (JP) .............................. JP2020-001898

(51) Int. Cl.
*B41J 2/175* (2006.01)
*B41J 3/36* (2006.01)
*B41J 23/00* (2006.01)
*H02J 50/00* (2016.01)

(52) U.S. Cl.
CPC ............. *B41J 3/36* (2013.01); *B41J 2/17566* (2013.01); *B41J 23/00* (2013.01); *H02J 50/00* (2016.02)

(58) Field of Classification Search
CPC ................................ B41J 3/36; B41J 2/17566
See application file for complete search history.

(56) References Cited

U.S. PATENT DOCUMENTS

| 5,183,716 A | 2/1993 | Nakacho et al. |
| 5,589,859 A * | 12/1996 | Schantz ................. B41J 29/393 347/50 |
| 5,848,848 A * | 12/1998 | St. Jean ................. B41J 29/393 400/54 |
| 2008/0049078 A1 * | 2/2008 | Zhang .................... B41J 2/1753 73/290 R |
| 2016/0236493 A1 * | 8/2016 | Lyman ..................... B41J 29/13 |

FOREIGN PATENT DOCUMENTS

| JP | H02-223158 A | 9/1990 |
| JP | 2016-175374 A | 10/2016 |

* cited by examiner

*Primary Examiner* — Jason S Uhlenhake
(74) *Attorney, Agent, or Firm* — Global IP Counselors, LLP

(57) ABSTRACT

A mobile device configured to be coupled to a counterpart device includes a driving section configured to be driven by electric power, a coupling section configured to be coupled to the counterpart device, and an accommodation section configured to accommodate an all-solid-state battery. When the counterpart device is coupled to the coupling section, the driving section is driven by electric power supplied from the counterpart device, and when the counterpart device is not coupled to the coupling section, the driving section is driven by electric power supplied from the all-solid-state battery.

9 Claims, 7 Drawing Sheets

MOBILE DEVICE AND LIQUID STORING CARTRIDGE

The present application is based on, and claims priority from JP Application Serial Number 2020-001898, filed Jan. 9, 2020, the disclosure of which is hereby incorporated by reference herein in its entirety.

BACKGROUND

1. Technical Field

The present disclosure relates to a mobile device and a liquid storing cartridge.

2. Related Art

Mobile devices which are small, portable, and lightweight have been used. JP-A-2016-175374 discloses a printer, such as a portable thermal printer or a portable ink jet printer, as an example of the mobile devices, for example. The printer disclosed in JP-A-2016-175374 includes a lithium-ion battery disposed therein and is driven by electric power supplied from the lithium-ion battery.

Furthermore, JP-A-2-223158 discloses an all-solid-state battery.

It is difficult to employ an electrolyte battery, such as a lithium-ion battery, using an electrolyte solution in mobile devices likely to receive an impact at a time of transport or at a time of use in terms of safety. In particular, mobile devices, such as an ink cartridge, include liquid, and therefore, when an electrolyte battery is mounted on such a mobile device, a positive electrode and a negative electrode of the electrolyte battery may be short-circuited due to the liquid. Accordingly, there arises a problem in safety.

Therefore, in general, such a mobile device does not include a battery in practice and is configured where appropriate such that the mobile device is driven by electric power supplied from a counterpart device when the mobile device is attached to the counterpart device.

However, with this configuration, the mobile device may not be solely driven. When an ink cartridge has a function for making a notification of an amount of remaining ink, for example, the notification of an amount of remaining ink may not be made in a state in which the ink cartridge is not installed in the counterpart device, such as a printer, and therefore, usability is insufficient.

On the other hand, the all-solid-state battery disclosed in JP-A-2-223158 includes a solid electrolyte, and therefore, such a problem that arises in the case of lithium ion battery described above does not arise. Accordingly, the all-solid-state battery may be mounted on the mobile device.

However, an all-solid-state battery having capacity capable of driving the mobile device for a long period of time is required when the all-solid-state battery is simply mounted on the mobile device, and consequently, there arises a problem in that a size of the all-solid-state battery is increased, and therefore, a size of the mobile device is increased.

SUMMARY

According to an aspect of the present disclosure, a mobile device configured to be coupled to a counterpart device includes a driving section configured to be driven by electric power, a coupling section configured to be coupled to the counterpart device, and an accommodation section configured to accommodate an all-solid-state battery. When the counterpart device is coupled to the coupling section, the driving section is driven by electric power supplied from the counterpart device, and when the counterpart device is not coupled to the coupling section, the driving section is driven by electric power supplied from the all-solid-state battery.

According to another aspect of the present disclosure, a liquid storing cartridge configured to be coupled to a liquid ejecting apparatus ejecting liquid includes a storage section configured to store liquid inside the storage section, a driving section configured to perform, by electric power, driving associated with the storage section, a coupling section configured to be coupled to the liquid ejecting apparatus, and an accommodation section configured to accommodate an all-solid-state battery. When the liquid ejecting apparatus is coupled to the coupling section, the driving section is driven by electric power supplied from the liquid ejecting apparatus, and when the liquid ejecting apparatus is not coupled to the coupling section, the driving section is driven by electric power supplied from the all-solid-state battery.

DESCRIPTION OF EXEMPLARY EMBODIMENTS

Figure 1:
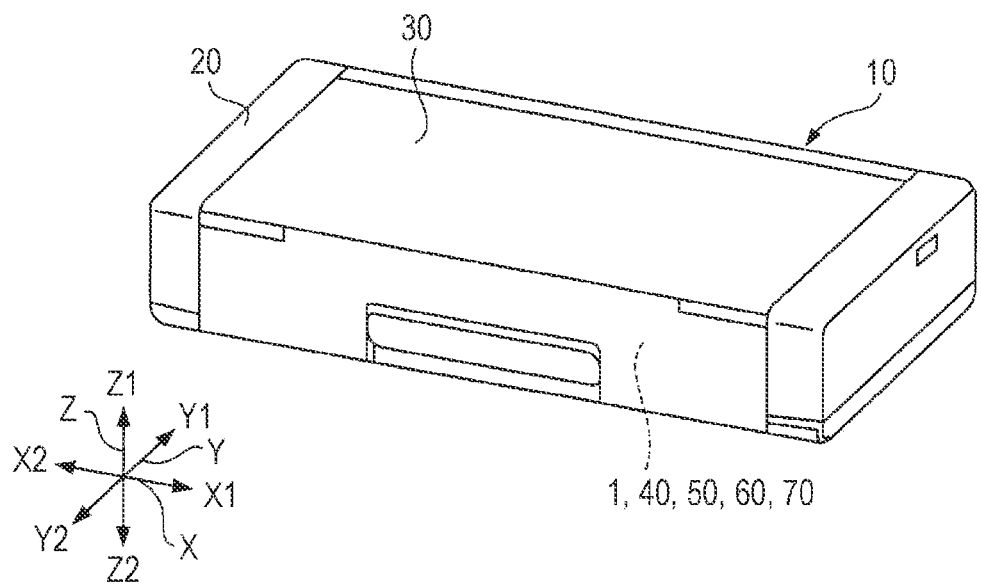
FIG. 1 is a perspective view of appearance of a mobile printer illustrated as a counterpart device according to a first embodiment.

Preferred embodiments of the present disclosure will be described hereinafter with reference to the accompanying drawings. Note that sizes and scales of components in the drawings are different from actual sizes and actual scales of the components and are schematically illustrated to facilitate understanding where appropriate. Note that the scope of the present disclosure is not limited to the embodiments described below unless limitation of the present disclosure is particularly described hereinafter.

1. First Embodiment

1-1. Brief Description of Counterpart Device

Figure 2:
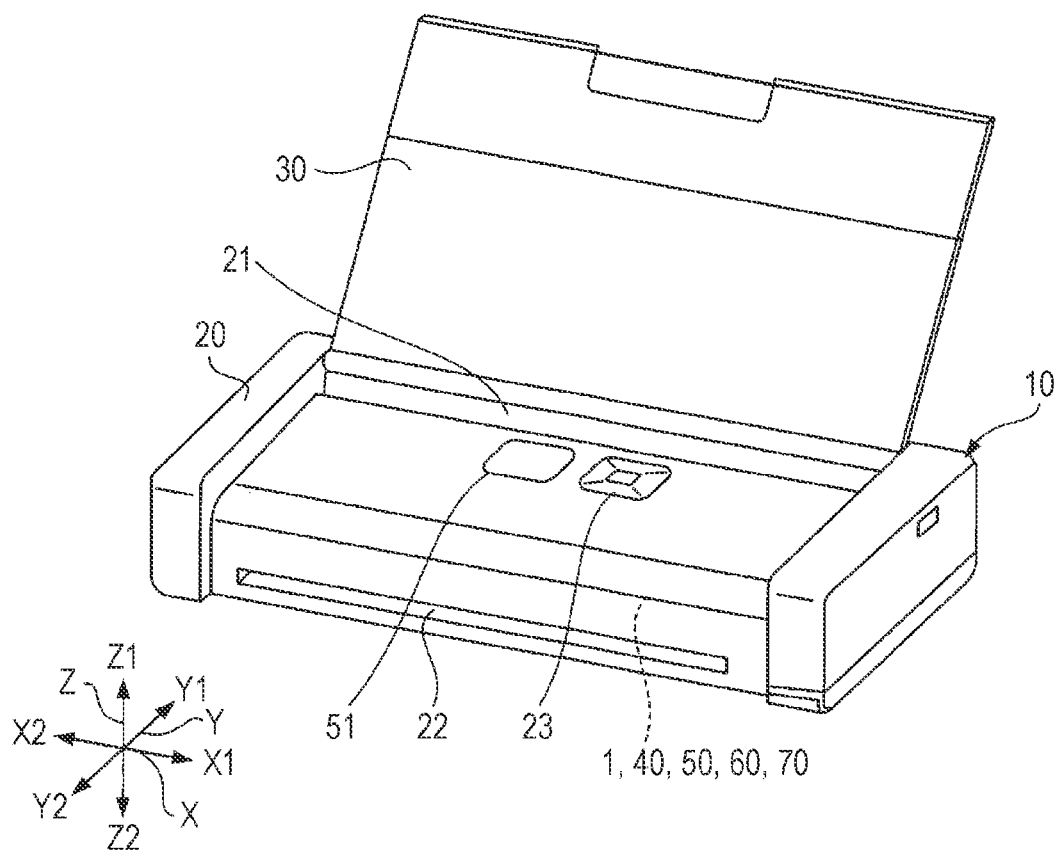
FIG. 2 is a perspective view of appearance of the mobile printer in a print available state.
Figure 3:
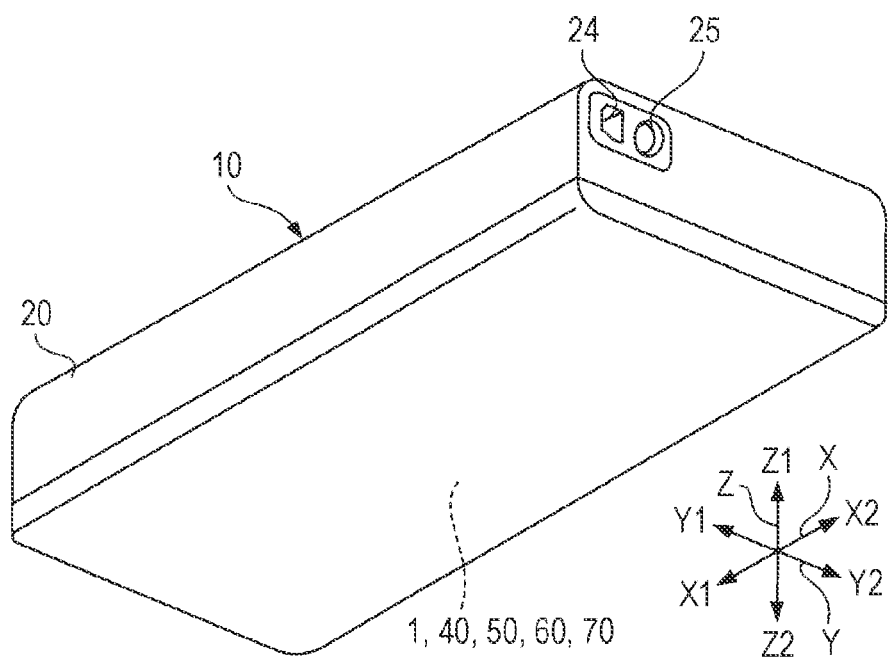
FIG. 3 is a perspective view of appearance of the mobile printer viewed from a direction opposite to a direction of FIG. 1.
Figure 4:
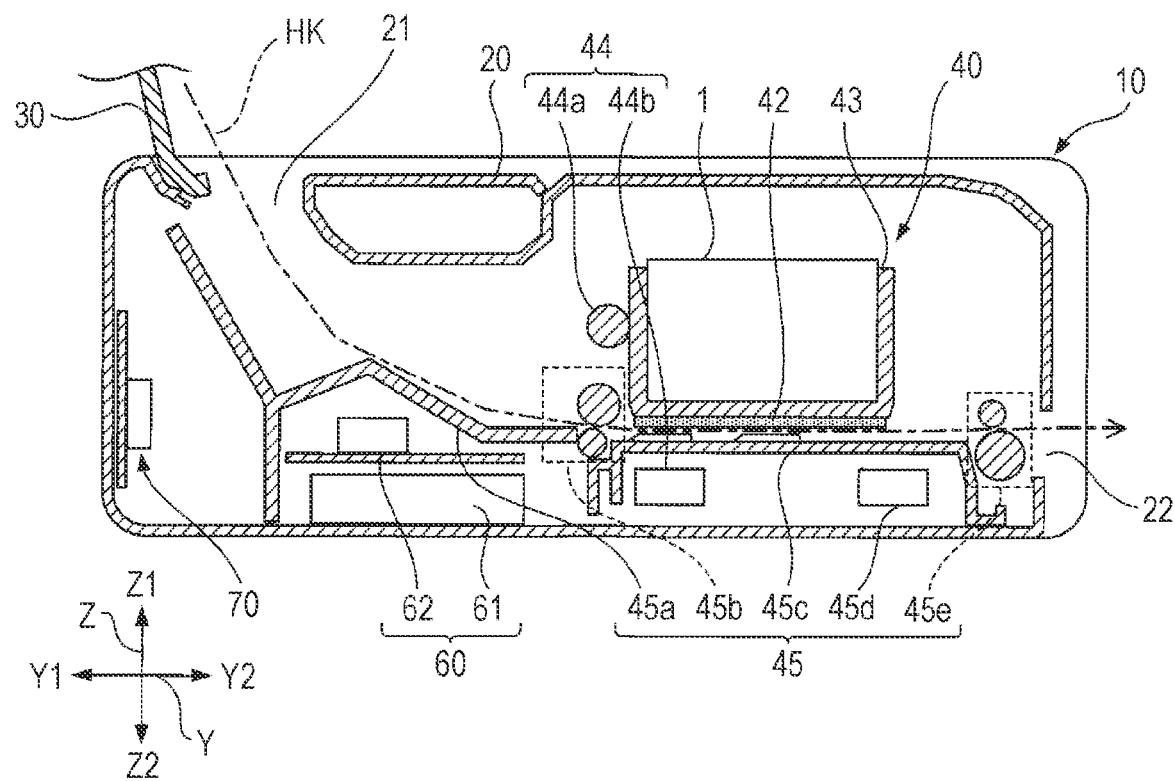
FIG. 4 is a sectional view schematically illustrating a configuration of the mobile printer.

FIG. 1 is a perspective view of appearance of a mobile printer 10 illustrated as a counterpart device according to a first embodiment. FIG. 2 is a perspective view of appearance of the mobile printer 10 in a print available state. FIG. 3 is a perspective view of appearance of the mobile printer 10 viewed from a direction opposite to a direction of FIG. 1. FIG. 4 is a sectional view schematically illustrating a configuration of the mobile printer 10.

The mobile printer 10 is a mobile ink jet printer which is an example of a liquid ejecting apparatus. The mobile printer 10 is coupled to a liquid storing cartridge 1 which is an example of a mobile device. The mobile printer 10 performs printing by ejecting ink which is an example of liquid stored in the liquid storing cartridge 1 as liquid droplets to a print medium. A typical example of the print medium is a printing sheet. Note that the print medium is not limited to the printing sheet and may be a printing target of arbitrary material, such as a resin film or fabric, for example.

Hereinafter, an "X axis", a "Y axis", and a "Z axis" which orthogonally intersect with one another are appropriately used in a description below for convenience of description. Furthermore, a direction along the X axis is referred to as an "X1 direction" and a direction opposite to the X1 direction is referred to as an "X2 direction". Similarly, a direction along the Y axis is referred to as a "Y1 direction" and a direction opposite to the Y1 direction is referred to as a "Y2 direction". Furthermore, a direction along the Z axis is referred to as a "Z1 direction" and a direction opposite to the Z1 direction is referred to as a "Z2 direction". Here, during printing by the mobile printer 10, the Y2 direction indicates a "front side", the Y1 direction indicates a "rear side", the Z1 direction indicates an "upper side", and the Z2 direction indicates a "lower side". Note that the present disclosure includes not only the state in which the X, Y, and Z axes orthogonally intersect with one another but also a state in which the X, Y, and Z axes intersect with one another at an angle within a range of equal to or larger than 80 degrees and equal to or smaller than 100 degrees.

As illustrated in FIGS. 1 to 3, the mobile printer 10 includes a case 20, a cover 30, a print unit 40, a display unit 50, a power supply unit 60, and a control unit 70.

The case 20 is a structure supporting the cover 30, the print unit 40, the display unit 50, the power supply unit 60, and the control unit 70. The case 20 of this embodiment is a box having an inner space accommodating the print unit 40, the power supply unit 60, and the control unit 70.

As illustrated in FIG. 2, the case 20 has a sheet supply port 21, a sheet discharge port 22, a display panel 51, and an operation switch 23. The sheet supply port 21 is an opening for supplying a print medium to the mobile printer 10. The sheet discharge port 22 is an opening for discharging a print medium from the mobile printer 10. The display panel 51 is one of components of the display unit 50 and displays various information associated with the mobile printer 10. The display panel 51 is a liquid crystal panel, an electronic paper panel, or an organic electroluminescence panel, for example. The operation switch 23 receives an operation performed by a user. Note that the display panel 51 and the operation switch 23 may be integrally configured as a touch panel.

As illustrated in FIG. 3, the case 20 has, in addition to the components illustrated in FIG. 2, a direct current (DC) jack 24 and a universal serial bus (USB) port 25 disposed thereon. A DC plug of an alternating current (AC) adapter, not illustrated, may be inserted into the DC jack 24. Therefore, electric power may be externally supplied to the mobile printer 10 through the DC jack 24. A connector of an USB cable, not illustrated, may be inserted into the USB port 25. Therefore, image information may be supplied to the mobile printer 10 from an external apparatus, such as a personal computer or a digital still camera, through the USB port 25.

As illustrated in FIGS. 1 and 2, the cover 30 is a plate-like member disposed on the case 20 in an openable and closable manner. The cover 30 may be in a close state as illustrated in FIG. 1 and an open state as illustrated in FIG. 2. Here, the cover 30 bends along an upper surface and a front surface of the case 20 such that the sheet supply port 21 and the sheet discharge port 22 described above are covered in the close state as illustrated in FIG. 1. On the other hand, in the open state as illustrated in FIG. 2, the cover 30 is opened to expose the sheet supply port 21 and the sheet discharge port 22, and the cover 30 supports a portion of a print medium exposed to an outside of the sheet supply port 21 when a portion of the print medium is inserted into the sheet supply port 21.

The print unit 40 has a function of ejecting liquid droplets of ink to a print medium and a function of changing the relative positional relationship between a position of the ejection and the print medium. As illustrated in FIG. 4, the print unit 40 includes a head unit 42, a carriage 43, a movement mechanism 44, and a transport mechanism 45. Here, the liquid storing cartridge 1 is mounted on the carriage 43.

The liquid storing cartridge 1 accommodates ink to be supplied to the head unit 42. Although not illustrated, the liquid storing cartridge 1 includes a plurality of accommodation sections accommodating ink. Different types of ink are accommodated in the different accommodation sections. When the number of the plurality of accommodation sections is four, for example, four different colors of ink, that is, cyan, magenta, yellow, and black, are accommodated in the different accommodation sections. Here, the liquid storing cartridge 1 may be constituted by a plurality of cartridges obtained by division for the accommodation sections. Furthermore, the number of accommodation sections included in the liquid storing cartridge 1 is not limited to four and may be arbitrarily determined. Note that the liquid storing cartridge 1 will be described in detail in the section "1-3." below.

The head unit 42 ejects ink supplied from the liquid storing cartridge 1 as liquid droplets to a print medium under control of the control unit 70. The head unit 42 includes at least one recording head 42a. Although not illustrated, the recording head 42a includes a plurality of ejection sections ejecting ink. Each of the ejection sections includes a cavity accommodating ink, a nozzle communicating with the cavity, and a piezoelectric element changing pressure of the cavity such that ink is ejected from the nozzle, for example. Note that each of the ejection sections may eject ink from the nozzle using a heater heating the ink included in the cavity instead of the piezoelectric element.

The carriage 43 is a structure including the liquid storing cartridge 1 and the head unit 42 described above mounted thereon. Although not illustrated, the carriage 43 is electrically coupled to the control unit 70 through a cable, such as a flexible flat cable. With this configuration, the liquid storing cartridge 1 and the head unit 42 are electrically coupled to the control unit 70. Note that the liquid storing cartridge 1 may not be mounted on the carriage 43 but may be attached to the case 20. In this case, ink may be supplied from the liquid storing cartridge 1 through a tube to the head unit 42, for example.

The movement mechanism 44 causes the carriage 43 to reciprocate in the X1 direction and the X2 direction relative to the case 20 under control of the control unit 70. The movement mechanism 44 includes a guide shaft 44a and a motor 44b. The guide shaft 44a is fixed to the case 20 and supports the carriage 43 such that the carriage 43 is movable along the X axis. The motor 44b causes the carriage 43 to reciprocate in the X1 direction and the X2 direction along the guide shaft 44a through a transmission mechanism, not illustrated.

The transport mechanism 45 transports a print medium in the Y2 direction along a transport path HK relative to the case 20 under control of the control unit 70. The transport mechanism 45 includes a guide section 45a, a platen 45b, a sheet supply roller pair 45c, a transport roller pair 45d, and a motor 45e. The guide section 45a guides a print medium supplied from the sheet supply port 21 to the sheet supply roller pair 45c. The platen 45b is a plate-like board supporting a print medium in a state in which ink ejected from the head unit 42 is received. The sheet supply roller pair 45c supplies print media onto the platen 45b one by one. The transport roller pair 45d transports a print medium on the platen 45b to the sheet discharge port 22. The motor 45e individually drives the sheet supply roller pair 45c and the transport roller pair 45d.

The display unit 50 displays various information associated with the mobile printer 10 under control of the control unit 70. The display unit 50 includes, in addition to the display panel 51 described above, a driver driving the display panel 51 and the like. The display unit 50 displays various information including operation information and state information of the mobile printer 10 where appropriate.

The power supply unit 60 supplies electric power to the sections included in the mobile printer 10 under control of the control unit 70. In the example of FIG. 4, the power supply unit 60 is disposed on an inner surface of a bottom plate of the case 20. The power supply unit 60 includes an electrolyte battery 61 and a power supply circuit 62. The power supply circuit 62 supplies electric power to the sections included in the mobile printer 10 using at least one of electric power supplied from the DC jack 24 described above and electric power supplied from the electrolyte battery 61.

Here, the electrolyte battery 61 is a lithium-ion battery or the like including a liquid electrolyte causing ions to be transmitted between a positive electrode and a negative electrode. The electrolyte battery 61 of this embodiment is a secondary battery. The power supply circuit 62 charges the electrolyte battery 61 using electric power supplied from the DC jack 24 where appropriate.

The control unit 70 controls operations of the sections included in the mobile printer 10. In the example of FIG. 4, the control unit 70 is disposed on an inner surface of a side plate of the case 20.

1-2. Functional Configuration of Counterpart Device

Figure 5:
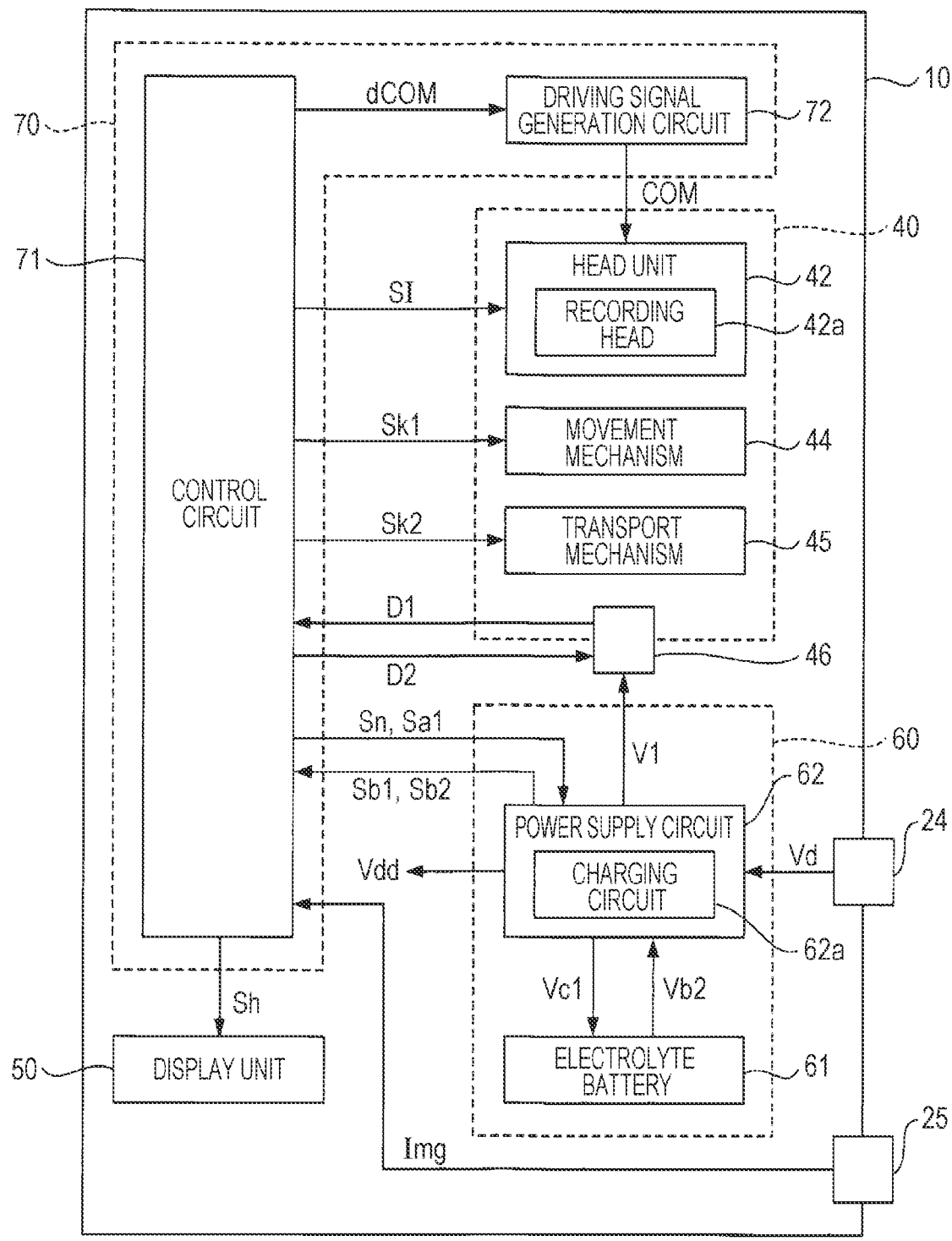
FIG. 5 is a diagram illustrating an electric configuration of the mobile printer.

FIG. 5 is a diagram illustrating an electric configuration of the mobile printer 10. In FIG. 5, electric components in the components described above included in the mobile printer 10 are illustrated. Note that, among the electric components, the operation switch 23 is omitted in FIG. 5.

As illustrated in FIG. 5, the print unit 40 includes, in addition to the components described above, a coupling section 46. The coupling section 46 is an electric part, such as a terminal, an electrode, or a connector, or a circuit which may be electrically coupled to the liquid storing cartridge 1. The coupling section 46 and the liquid storing cartridge 1 may be coupled to each other in a wired manner or a wireless manner. When the wired coupling is employed, the coupling section 46 is disposed in the carriage 43 described above, for example. When the wireless coupling is employed, the coupling section 46 is disposed in an arbitrary position.

The power supply circuit 62 and the control unit 70 are individually coupled to the coupling section 46 in an electric manner. A voltage V1 for the liquid storing cartridge 1 is supplied from the power supply circuit 62 to the coupling section 46. Furthermore, as described below in detail, a signal D1 indicating information on a state of the liquid storing cartridge 1 is supplied from the liquid storing cartridge 1 to the coupling section 46. The signal D1 is supplied to the control unit 70.

Here, a voltage Vb2 is supplied from the electrolyte battery 61 to the power supply circuit 62. Furthermore, when electric power is supplied to the DC jack 24, a voltage Vd is supplied from the DC jack 24 to the power supply circuit 62. The power supply circuit 62 generates a voltage Vdd to be used to drive the sections including the mobile printer 10 using at least one of the voltages Vd and Vb2. Furthermore, a voltage Vc1 to be used for charging is supplied from the power supply circuit 62 to the electrolyte battery 61. The power supply circuit 62 includes a charge circuit 62a generating the voltage Vc1 using the voltage Vd. Furthermore, the power supply circuit 62 generates a state signal Sb1 indicating information on a state, such as a voltage value, of the voltage Vd and a state signal Sb2 indicating information on a state, such as a voltage value, of the voltage Vc1.

As illustrated in FIG. 5, the control unit 70 includes a control circuit 71 and a driving signal generation circuit 72.

The control circuit 71 is a processor including at least one central processing unit (CPU), for example. Note that the control circuit 71 may include, instead of a portion of the at least one CPU or the entire of the at least one CPU or in addition to at least one CPU, a digital signal processor (DSP), an application specific integrated circuit (ASIC), a programmable logic device (PLD), or a field programmable gate array (FPGA).

The control circuit 71 generates, as signals controlling operations of the sections included in the mobile printer 10, a signal D2, control signals Sk1, Sk2, Sh, and Sal, a power supply selection signal Sn, a waveform specifying signal dCOM, and a print signal SI.

The signal D2 indicates information on an amount of use of ink. Although described below in detail, the signal D2 is supplied to the liquid storing cartridge 1 through the coupling section 46. The liquid storing cartridge 1 calculates an amount of remaining ink in the liquid storing cartridge 1 based on the signal D2, for example.

The control signal Sk1 controls driving of the movement mechanism 44. The movement mechanism 44 causes the carriage 43 to reciprocate at a predetermined timing and a predetermined speed based on the control signal Sk1.

The control signal Sk2 controls driving of the transport mechanism 45. The transport mechanism 45 transports a print medium at a predetermined timing in synchronization with an operation timing of the movement mechanism 44 based on the control signal Sk2.

The control signal Sh controls driving of the display unit 50. The display unit 50 displays predetermined information based on the control signal Sh.

The power supply selection signal Sn and the control signal Sal control operation of the power supply unit 60. Specifically, the power supply selection signal Sn controls selection of a power supply source performed by the power supply circuit 62. The power supply circuit 62 selects at least one of the DC jack 24 and the electrolyte battery 61 as a power supply source of the mobile printer 10 based on the power supply selection signal Sn. The control signal Sa1 controls charge on the electrolyte battery 61 performed by the power supply circuit 62. The power supply circuit 62 determines whether the electrolyte battery 61 is to be charged or controls electric power to be used to charge the electrolyte battery 61 based on the control signal Sa1.

Here, the control circuit 71 generates the power supply selection signal Sn and the control signal Sa1 appropriately using the state signals Sb1 and Sb2 described above.

The print signal SI is a digital signal used to specify a type of operation of the head unit 42.

Specifically, the print signal SI specifies an amount of ink to be ejected from the head unit 42 and the like by determining whether a driving signal COM generated by the driving signal generation circuit 72 is to be supplied to the head unit 42 every predetermined unit period.

The waveform specifying signal dCOM is a digital signal specifying a waveform of the driving signal COM generated by the driving signal generation circuit 72.

The driving signal generation circuit 72 generates the driving signal COM used to drive the head unit 42 using the voltage Vdd. For example, the driving signal generation circuit 72 includes a DA conversion circuit and an amplification circuit. In the driving signal generation circuit 72, the DA conversion circuit converts a digital waveform specifying signal dCOM supplied from the control circuit 71 into an analog signal, and the amplification circuit generates a driving signal COM by amplifying the analog signal.

1-3. Detailed Description of Mobile Device

Figure 6:
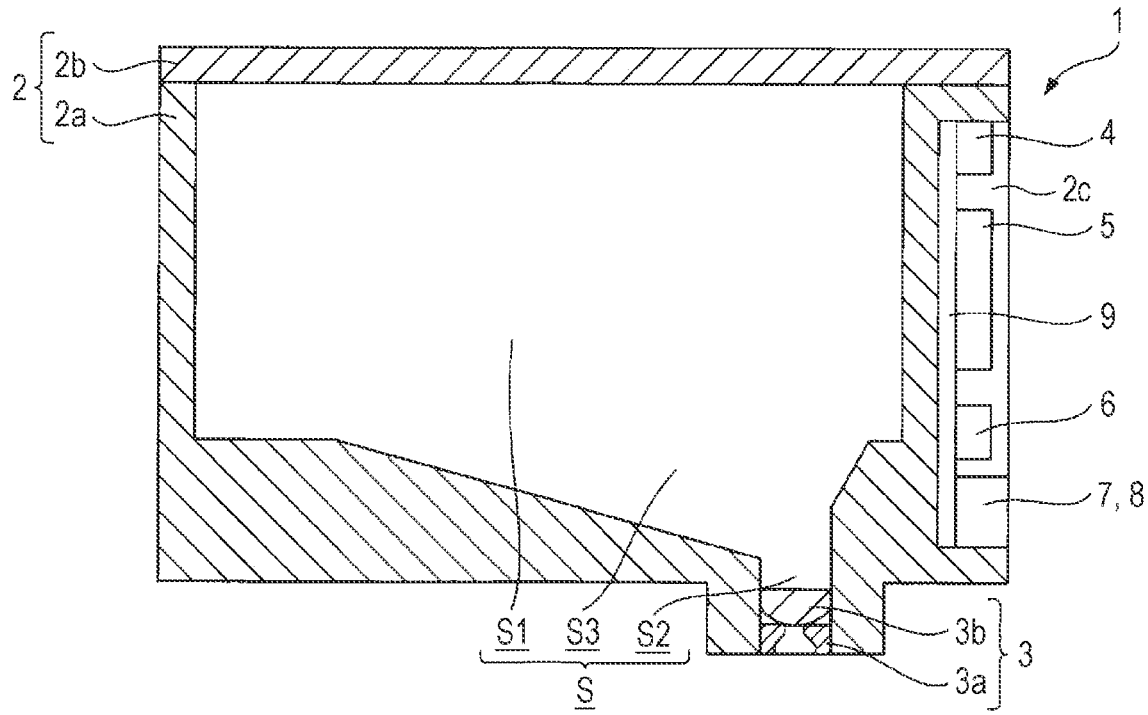
FIG. 6 is a sectional view schematically illustrating a configuration of a liquid storing cartridge which is an example of a mobile device according to the first embodiment.

FIG. 6 is a sectional view schematically illustrating a configuration of the liquid storing cartridge 1 which is an example of the mobile device according to the first embodiment. As illustrated in FIG. 6, the liquid storing cartridge 1 includes a container 2, a sealing mechanism 3, a notification section 4 which is an example of a driving section, an all-solid-state battery 5, a power supply circuit 6, coupling sections 7 and 8, and a control circuit 9 which is an example of a controller.

The container 2 is a member storing ink which is an example of liquid. The container 2 includes a container body 2*a* and a lid body 2*b*. The container body 2*a* has a recessed portion for forming a storage section S storing ink. Furthermore, the container body 2*a* includes an accommodation section 2*c* accommodating the notification section 4, the all-solid-state battery 5, the power supply circuit 6, the coupling sections 7 and 8, and the control circuit 9. In the example of FIG. 6, the accommodation section 2*c* is a depression formed at an outer surface of the container body 2*a*. The lid body 2*b* is fixed on the container body 2*a* by an adhesive agent or screws so as to cover an opening of the recessed portion of the container body 2*a*. A storage section S includes an accommodation chamber S1, a discharge port S2, and a communication path S3. The accommodation chamber S1 is a space accommodating ink. The discharge port S2 is an opening discharging ink. The communication path S3 serves as a space for communication between the accommodation chamber S1 and the discharge port S2 and a flow path allowing ink to flow from the accommodation chamber S1 to the discharge port S2. Note that shapes of the container 2 and the storage section S are not limited to those illustrated in FIG. 6 and may be arbitrarily determined. Note that a position or a shape of the accommodation section 2*c* are also not limited to those illustrated in FIG. 6 and may be arbitrarily determined.

The sealing mechanism 3 suppresses ink unintentionally flowing out of the discharge port S2 described above. The sealing mechanism 3 includes an elastic member 3*a* and a valve element 3*b*.

The elastic member 3*a* is configured by elastic material, such as gum material, and has a circle shape arranged along an inner peripheral surface of the discharge port S2. A guide pin, not illustrated, guiding ink to the mobile printer 10 is inserted into the elastic member 3*a* in a state in which the liquid storing cartridge 1 is attached on the mobile printer 10. Here, an inner peripheral surface of the elastic member 3*a* adheres tightly to an outer peripheral surface of the guide pin so that ink is not guided from the discharge port S2 to the guide pin, and therefore, leakage of ink to an outside is suppressed.

The valve element 3*b* disposed in a position closer to the accommodation chamber S1 or the communication path S3 relative to the elastic member 3*a* covers the discharge port S2 in a state in which the liquid storing cartridge 1 is not attached to the mobile printer 10. The valve element 3*b* is configured by elastic material, such as gum material, for example. In the state in which the liquid storing cartridge 1 is attached to the mobile printer 10, the valve element 3*b* is pushed toward the communication path S3 from the discharge port S2 by the guide pin described above. In this case, a gap is formed between the valve element 3*b* and an inner wall surface of the storage section S, and therefore, ink may be guided from the storage section S to the guide pin.

The notification section 4, the all-solid-state battery 5, the power supply circuit 6, the coupling sections 7 and 8, and the control circuit 9 are disposed on an outside of the container 2 and are fixed on the container 2 by an adhesive agent or screws. Note that the arrangement of the components are not limited to those illustrated in FIG. 6 and may be arbitrarily determined. For example, the different components may be disposed on different surfaces of the container 2.

Figure 7:
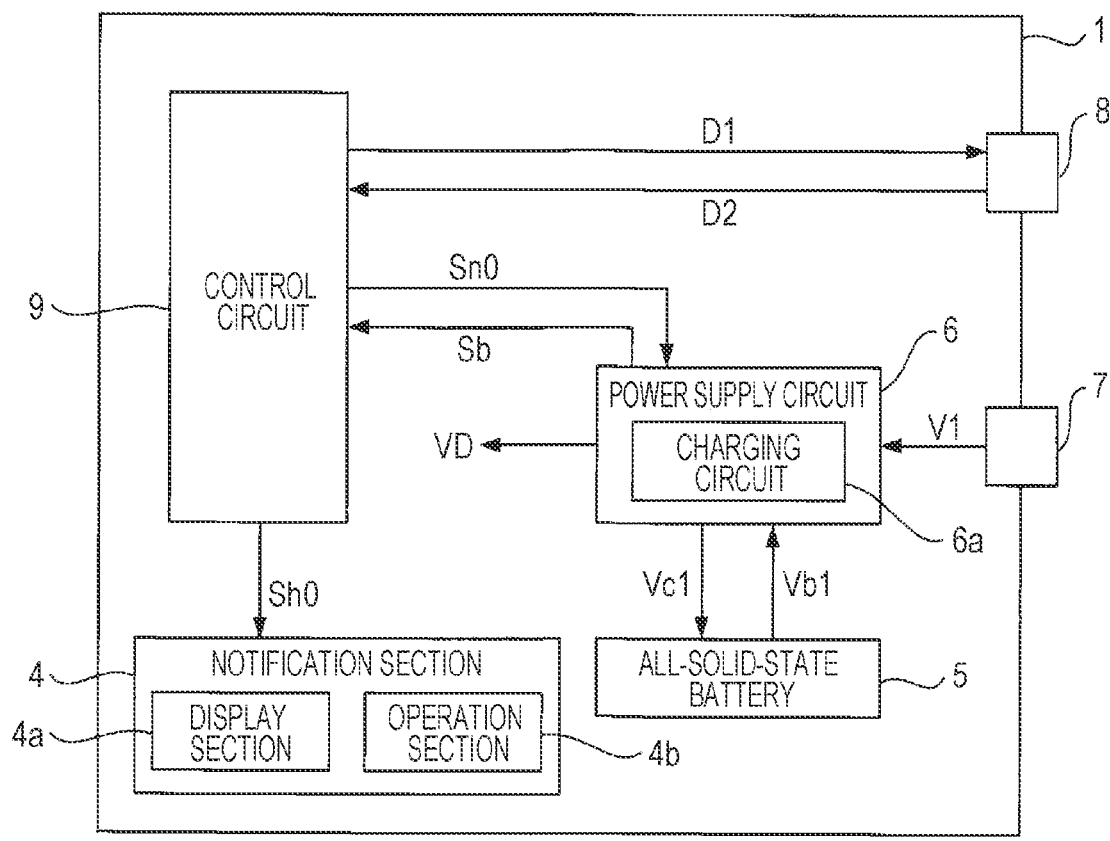
FIG. 7 is a diagram illustrating an electric configuration of the liquid storing cartridge.

FIG. 7 is a diagram illustrating an electric configuration of the liquid storing cartridge 1. The notification section 4 transmits a notification of information on a state of the liquid storing cartridge 1, such as an amount of remaining ink, under control of the control circuit 9. As illustrated in FIG. 7, the notification section 4 of this embodiment includes a display section 4*a* displaying the information and an operation section 4*b*. The display section 4*a* includes at least one light emitting element, such as a light emitting diode (LED), for example, and displays the information by a lighting state of the light emitting element. The operation section 4*b* is an input device, such as a switch, receiving a user operation. The operation section 4*b* generates a signal Ss in response to the operation. Note that the notification section 4 at least makes a notification of the information, a configuration of the notification section 4 is not limited to the configuration including the display section 4*a*, and the notification of the information may be made by sound or the like. Furthermore, the operation section 4*b* and the notification section 4 may be separately disposed. Furthermore, the operation section 4*b* is disposed where appropriate and may be omitted.

In the all-solid-state battery 5, a solid-state electrolyte performs conduction of ions between the positive electrode and the negative electrode. The solid-state electrolyte may be an inorganic solid-state electrolyte, such as an electrolyte of an oxide system or an electrolyte of a sulfide system, an organic solid-state electrolyte, such as an electrolyte of a macromolecular system, an electrolyte of a wet system having moisture, or an electrolyte of a dry system without moisture. The all-solid-state battery 5 of this embodiment is a secondary battery.

The power supply circuit 6 supplies electric power to the sections included in the liquid storing cartridge 1 under control of the control circuit 9. The power supply circuit 6 supplies electric power to the sections of the mobile printer 10 using at least one of electric power supplied from the coupling section 7 and electric power supplied from the all-solid-state battery 5. Specifically, the power supply circuit 6 receives the voltage V1 supplied from the coupling section 7 or a voltage Vb1 supplied from the all-solid-state battery 5. The power supply circuit 6 generates a voltage VD to be used to drive the notification section 4 and a voltage Vc1 to be used to charge the all-solid-state battery 5 using at least one of the voltages V1 and Vb1. The power supply circuit 6 will be described in detail hereinafter with reference to FIG. 8.

Each of the coupling sections 7 and 8 is an electric part, such as a terminal, an electrode, or a connector, or a circuit which may be electrically coupled to the coupling section 46 of the mobile printer 10. The coupling sections 7 and 8 and the coupling section 46 may be coupled in a wired manner or a wireless manner. The mobile printer 10 supplies the voltage V1 to the coupling section 7. The mobile printer 10 supplies the signal D2 to the coupling section 8.

The control circuit 9 controls operations of the sections included in the liquid storing cartridge 1. Specifically, the control circuit 9 generates the signal D1, a control signal Sh0, and a power supply selection signal Sn0. The signal D1 indicates information on a state of the liquid storing cartridge 1, such as an amount of remaining ink. The control circuit 9 calculates a state, such as an amount of remaining ink, based on the signal D1. The control signal Sh0 controls driving of the notification section 4 based on the signal Ss supplied from the operation section 4b. The notification section 4 displays predetermined information, such as an amount of remaining ink, based on the control signal Sh0. The power supply selection signal Sn0 controls a selection of a power supply source performed by the power supply circuit 6 based on a state signal Sb described below. The power supply circuit 6 selects at least one of the coupling section 7 and the all-solid-state battery 5 as a power supply source for the liquid storing cartridge 1 based on the power supply selection signal Sn0.

Figure 8:
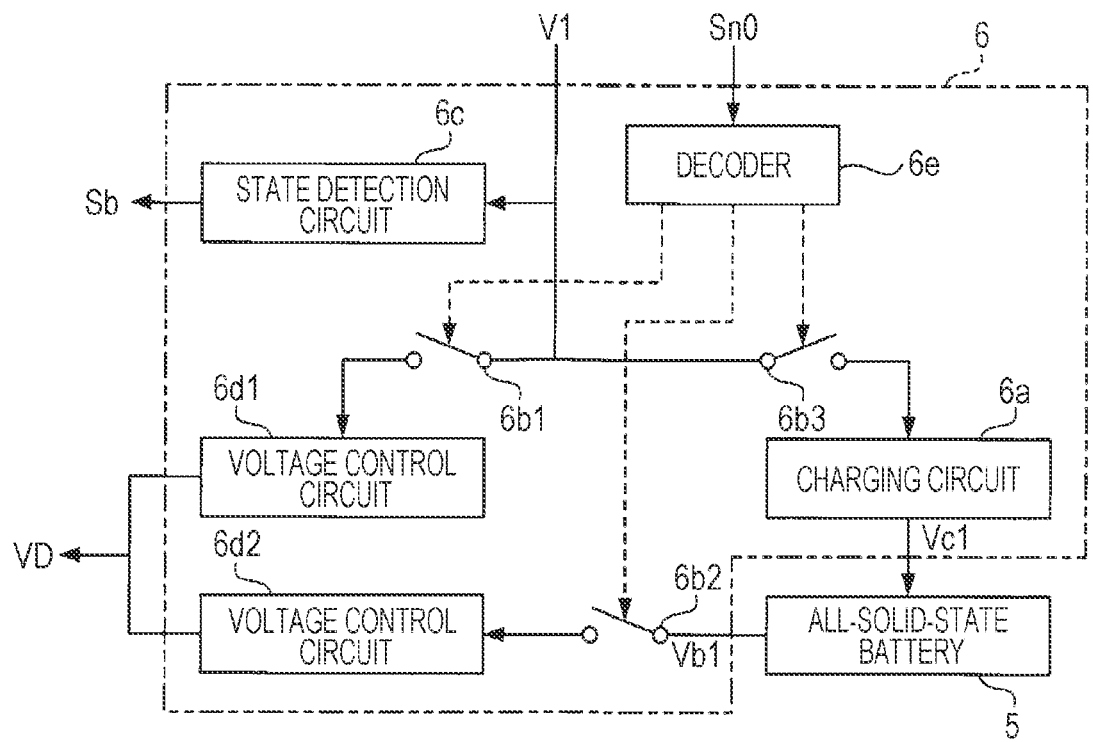
FIG. 8 is a diagram illustrating a configuration of a power supply circuit of the liquid storing cartridge.

FIG. 8 is a diagram illustrating a configuration of the power supply circuit 6 of the liquid storing cartridge 1. As illustrated in FIG. 8, the power supply circuit 6 includes a charging circuit 6a which is an example of a charging section, a first switch 6b1 which is an example of a first switching section, a second switch 6b2 which is an example of a second switching section, a third switch 6b3, a state detection circuit 6c, voltage control circuits 6d1 and 6d2, and a decoder 6e.

The charging circuit 6a generates a voltage V1 which has a fixed current value or a fixed voltage value to charge the all-solid-state battery 5. Here, when the liquid storing cartridge 1 is coupled to the mobile printer 10 in a wireless manner, the charging circuit 6a charges the all-solid-state battery 5 in a wireless manner.

The first switch 6b1 is an analog switch which may perform switching between a conductive state and a blocking state of electric power from the coupling section 7 to the voltage control circuit 6d1. Specifically, the voltage V1 is supplied to an input terminal of the first switch 6b1. On the other hand, an output terminal of the first switch 6b1 is electrically coupled to the voltage control circuit 6d1. Furthermore, a control terminal of the first switch 6b1 is coupled to the decoder 6e.

The second switch 6b2 is an analog switch which may perform switching between a conductive state and a blocking state of electric power supplied from the all-solid-state battery 5 to the voltage control circuit 6d2. Specifically, the voltage Vb1 is supplied to an input terminal of the second switch 6b2. On the other hand, an output terminal of the second switch 6b2 is electrically coupled to the voltage control circuit 6d2. Furthermore, a control terminal of the second switch 6b2 is coupled to the decoder 6e.

The third switch 6b3 is an analog switch which may perform switching between a conductive state and a blocking state of electric power supplied from the coupling section 7 to the charging circuit 6a. Specifically, the voltage V1 is supplied to an input terminal of the third switch 6b3. On the other hand, an output terminal of the third switch 6b3 is electrically coupled to the charging circuit 6a. Furthermore, a control terminal of the third switch 6b3 is coupled to the decoder 6e.

The state detection circuit 6c determines whether the mobile printer 10 is coupled to the coupling sections 7 and 8. For example, the state detection circuit 6c detects a voltage value of the voltage V or the like. The state detection circuit 6c outputs a state signal Sb indicating information on the voltage value or the like.

The voltage control circuit 6d1 generates a voltage VD of a predetermined voltage value by increasing or reducing the voltage V1. The voltage control circuit 6d2 generates a voltage VD of a predetermined voltage value by increasing or reducing the voltage Vb1. Note that the voltage control circuits 6d1 and 6d2 may be configured as a single circuit.

The decoder 6e performs switching among the first switch 6b1, the second switch 6b2, and the third switch 6b3 based on the power supply selection signal Sn0.

Figure 9:
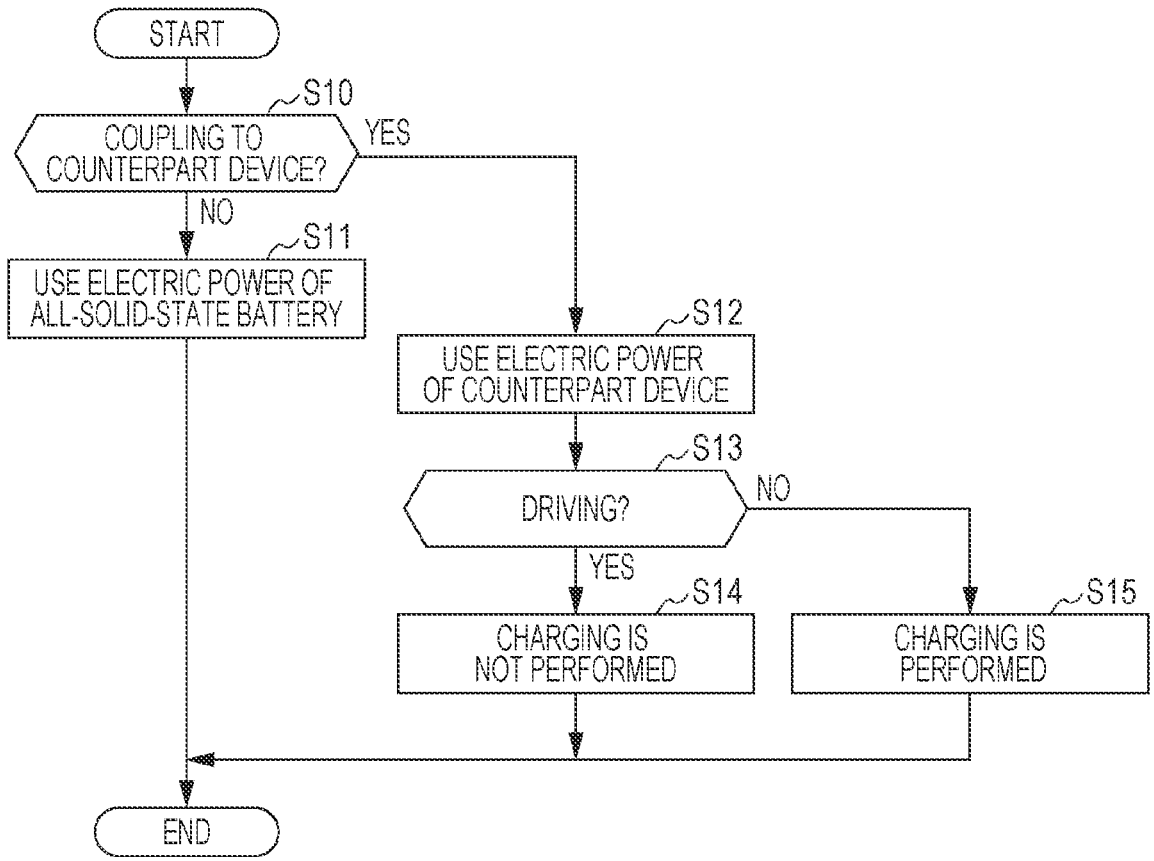
FIG. 9 is a flowchart of an operation performed by the liquid storing cartridge.

FIG. 9 is a flowchart of an operation of the liquid storing cartridge 1. As illustrated in FIG. 9, the control circuit 9 first determines whether the mobile printer 10 which is a counterpart device is coupled to the coupling sections 7 and 8 in step S10. Specifically, in step S10, the control circuit 9 determines whether the mobile printer 10 is coupled to the coupling sections 7 and 8 based on the state signal Sb supplied from the state detection circuit 6c.

When the mobile printer 10 is not coupled to the coupling sections 7 and 8, the control circuit 9 selects the all-solid-state battery 5 as a supply source of electric power to be used by the liquid storing cartridge 1 in step S11. Specifically, in step S11, the control circuit 9 brings the second switch 6b2 into a conductive state. Note that, although the control circuit 9 may bring the first switch 6b1 and the third switch 6b3 into any of the conductive state and the blocking state, the first switch 6b1 and the third switch 6b3 are preferably brought into a blocking state in terms of reduction of the number of unrequired energizing paths.

When the mobile printer 10 is coupled to the coupling sections 7 and 8, the control circuit 9 selects the mobile printer 10 as a supply source of electric power to be used by the liquid storing cartridge 1 in step S12. Specifically, in step S12, the control circuit 9 brings the first switch 6b1 into a conductive state. Furthermore, when the electric power of the mobile printer 10 is available, electric power of the all-solid-state battery 5 is not required to be consumed. Accordingly, the control circuit 9 preferably brings the third switch 6b3 into a blocking state in step S12 so that power consumption of the all-solid-state battery 5 is suppressed.

Subsequently, the control circuit 9 determines whether the notification section 4 is being driven in step S13. Specifically, the control circuit 9 determines whether the notification section 4 is being driven based on the signal Ss supplied from the operation section 4b in step S13.

When the notification section 4 is being driven, the control circuit 9 does not charge the all-solid-state battery 5 in step S14. Specifically, the control circuit 9 brings the third switch 6b3 into a blocking state in step S14.

When the notification section 4 is not being driven, the control circuit 9 charges the all-solid-state battery 5 in step S15. Specifically, the control circuit 9 brings the third switch 6b3 into a conductive state in step S15.

As described above, the switching control of power supply sources and control to determine whether the all-solid-state battery 5 is to be charged are performed.

The liquid storing cartridge 1 described above which is an example of a mobile device may be coupled to the mobile printer 10 which is an example of a counterpart device as described above. Furthermore, the liquid storing cartridge 1 includes the notification section 4 which is an example of a driving section, the coupling sections 7 and 8, and the accommodation section 2c. The notification section 4 is driven by electric power. The coupling sections 7 and 8 are coupled to the mobile printer 10. The accommodation section 2c accommodates the all-solid-state battery 5.

Here, when the mobile printer 10 is coupled to the coupling sections 7 and 8, the notification section 4 is driven by electric power supplied from the mobile printer 10. Therefore, on the other hand, when the mobile printer 10 is not coupled to the coupling sections 7 and 8, the notification section 4 is driven by electric power supplied from the all-solid-state battery 5.

In the liquid storing cartridge 1 described above, when the mobile printer 10 is not coupled to the coupling sections 7 and 8, the notification section 4 is driven by electric power supplied from the all-solid-state battery 5, and therefore, usability may be enhanced. Furthermore, an electrolyte battery is not required to be mounted on the liquid storing cartridge 1. Here, unlike electrolyte batteries, a problem does not arise in the all-solid-state battery 5 even when the all-solid-state battery 5 receives an impact at a time of delivery or at a time of use or even when liquid is attached to the all-solid-state battery 5. Accordingly, safety of the liquid storing cartridge 1 is ensured. Furthermore, when the mobile printer 10 is coupled to the coupling sections 7 and 8, the notification section 4 is driven by electric power supplied from the mobile printer 10, and therefore, capacity of the all-solid-state battery 5 may be reduced when compared with a configuration in which electric power supplied from the all-solid-state battery 5 is used at all time. Therefore, the all-solid-state battery 5 may be miniaturized, and furthermore, the liquid storing cartridge 1 may be miniaturized.

The liquid storing cartridge 1 of this embodiment further includes the charging circuit 6a which is an example of a charging section. When the mobile printer 10 is coupled to the coupling sections 7 and 8, the charging circuit 6a charges the all-solid-state battery 5 by electric power supplied from the mobile printer 10. Therefore, the all-solid-state battery 5 may be reduced in size, and furthermore, the liquid storing cartridge 1 may be miniaturized when compared with a configuration in which the all-solid-state battery 5 is not charged.

Note that, although the configuration in which the charging circuit 6a is used as a charging section is described above in this embodiment, the charging section charging the all-solid-state battery 5 may not be included. In this case, the charging circuit 6a and the third switch 6b3 illustrated in the block diagram of FIG. 8 and step S13 to step S15 in the flowchart of FIG. 9 are omitted. Furthermore, the second switch 6b2 is brought into a conductive state in step S11 and the first switch 6b1 is brought into a conductive state in step 312, and accordingly, the liquid storing cartridge 1 may be miniaturized while usability and safety of the liquid storing cartridge 1 are ensured. Note that, even in this case, the first switch 6b1 is preferably brought into a blocking state in step S11 and the second switch 6b2 is preferably brought into a blocking state in step S12 due to the reason the same as that of this embodiment.

Here, the charging circuit 6a does not charge the all-solid-state battery 5 when the notification section 4 is driven and charges the all-solid-state battery 5 when the notification section 4 is not driven. Therefore, unstable power supply to the notification section 4 due to charge on the all-solid-state battery 5 is suppressed. Furthermore, the all-solid-state battery 5 may be stably charged using electric power supplied from the mobile printer 10. Note that, when a sufficient amount of electric power is supplied from the mobile printer 10, the all-solid-state battery 5 may be charged while the notification section 4 is driven.

Furthermore, the charging circuit 6a preferably charges the all-solid-state battery 5 in a wireless manner. In this case, a terminal to be used for charging is not required to be disposed in the liquid storing cartridge 1. Consequently, a problem arising when liquid is attached to the terminal is avoided even when the liquid storing cartridge 1 includes the liquid. Furthermore, a degree of freedom of orientation of the liquid storing cartridge 1 at a time of charging may be enhanced when compared with a configuration in which the terminal is used. Consequently, usability may be enhanced.

The mobile printer 10 of this embodiment has the electrolyte battery 61 including an electrolyte solution and does not include an all-solid-state battery. Therefore, the number of components and cost may be reduced when compared with a configuration in which an all-solid-state battery is included in addition to the electrolyte battery 61. Furthermore, cost may be easily reduced and capacity of a battery may be easily increased when compared with a configuration in which the mobile printer 10 includes only an all-solid-state battery.

The liquid storing cartridge 1 includes the storage section S inside thereof storing ink which is an example of liquid. The notification section 4 of this embodiment makes a notification of an amount of ink remaining in the storage section S when being driven. Therefore, the user may recognize the amount of remaining ink without attaching the liquid storing cartridge 1 to the mobile printer 10.

Here, the notification section 4 includes a display section 4a indicating information on the amount of ink remaining in the storage section S. Therefore, the notification section 4 may be easily miniaturized and content of the notification is easily recognized by the user when compared with a configuration in which a notification is performed by sound or the like.

The liquid storing cartridge 1 of this embodiment includes the state detection circuit 6c which is an example of a detection section, the first switch 6b1 which is an example of a first switching section, a second switch 6b2 which is an example of a second switching section, and the control circuit 9 which is an example of a controller. The state detection circuit 6c determines whether the mobile printer 10 is coupled to the coupling sections 7 and 8. The first switch 6b1 may perform switching between a conductive state and a blocking state of electric power supplied from the mobile printer 10 to the notification section 4. The second switch 6b2 may perform switching between a conductive state and a blocking state of electric power supplied from the all-solid-state battery 5 to the notification section 4. The control circuit 9 individually controls switching of the first switch 6b1 and the second switch 6b2 based on a result of detection performed by the state detection circuit 6c. Therefore, the mobile printer 10 and the all-solid-state battery 5 may be appropriately used in a switching manner as a power supply source for the notification section 4.

Here, the first switch 6b1 is disposed in a power supply path for supplying electric power from the mobile printer 10 to the notification section 4 without passing the all-solid-state battery 5. In general, power generation efficiency of all-solid-state batteries is lower than that of electrolyte batteries. Therefore, when electric power is supplied from the mobile printer 10 to the notification section 4 through the all-solid-state battery 5, loss of the electric power is increased. On the other hand, when electric power is supplied from the mobile printer 10 to the notification section 4 without passing the all-solid-state battery 5, loss of the electric power may be reduced.

2. Second Embodiment

Hereinafter, a second embodiment of the present disclosure will be described. In the embodiment described below, components having operations and functions the same as those of the first embodiment are denoted by reference numerals used in the description of the first embodiment, and detailed descriptions thereof are appropriately omitted.

Figure 10:
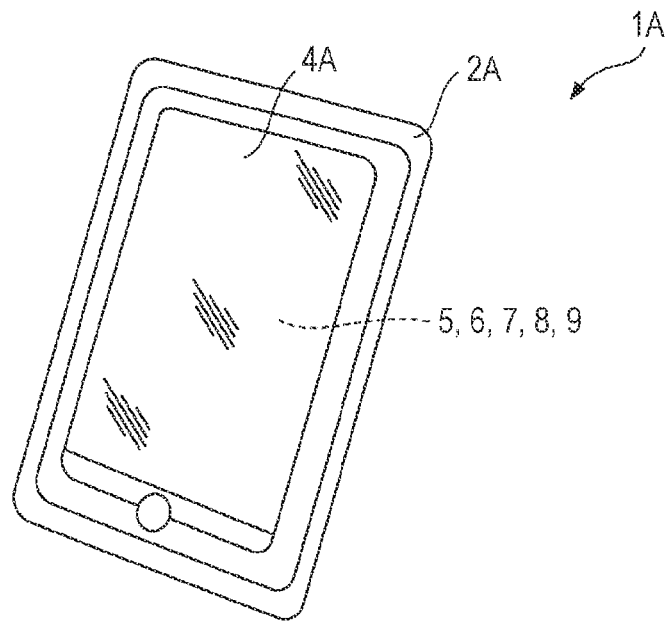
FIG. 10 is a perspective view of appearance of a smartphone which is an example of a mobile device according to a second embodiment.
Figure 11:
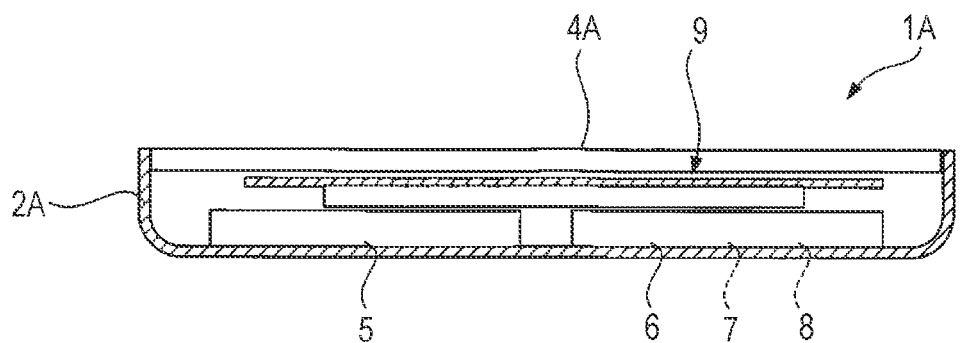
FIG. 11 is a sectional view schematically illustrating a configuration of the smartphone.
Figure 12:
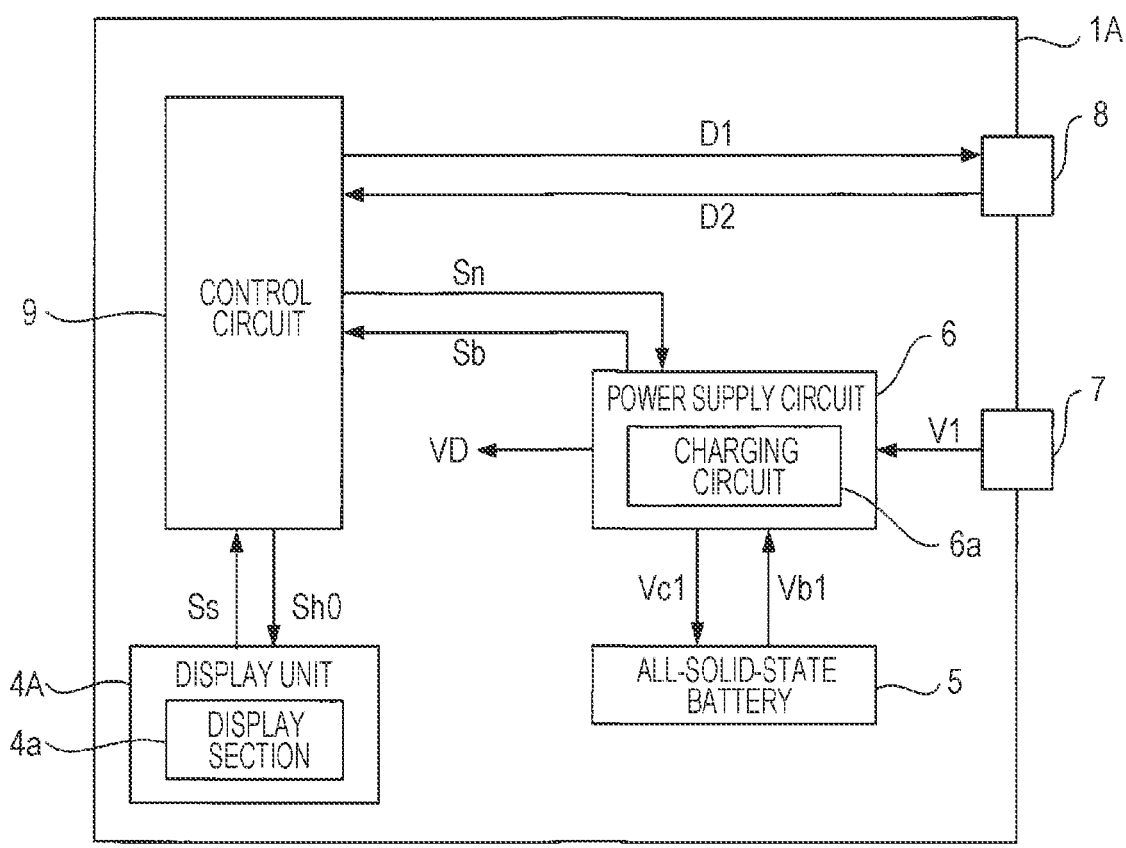
FIG. 12 is a diagram illustrating an electric configuration of the smartphone.

FIG. 10 is a perspective view of appearance of a smartphone 1A illustrated as a mobile device according to the second embodiment. FIG. 11 is a sectional view schematically illustrating a configuration of the smartphone 1A. FIG. 12 is a diagram illustrating an electric configuration of the smartphone 1A.

As illustrated in FIGS. 10 and 11, the smartphone 1A includes a case 2A, a display unit 4A which is an example of a driving section, an all-solid-state battery 5, a power supply circuit 6, coupling sections 7 and 8, and a control circuit 9 which is an example of a controller.

The case 2A is a structure supporting and accommodating the display unit 4A, the all-solid-state battery 5, the power supply circuit 6, the coupling sections 7 and 8, and the control circuit 9. The case 2A of this embodiment has a tray-like shape having an opening. The display unit 4A is a touch panel type display device disposed so as to cover the opening. The control circuit 9 controls operation of the display unit 4A and the power supply circuit 6.

An external apparatus, such as a personal computer (PC), is coupled to the coupling sections 7 and 8 of this embodiment as a counterpart device.

Effects the same as the first embodiment are obtained also in the second embodiment.

3. Modification

The embodiments described above may be variously modified. Modifications of the embodiments described above will be described in detail hereinafter. Two or more modes arbitrarily selected from modes illustrated below may be appropriately combined unless the modes conflict each other.

Although the liquid storing cartridge and the smartphone are described as mobile devices as examples in the embodiments described above, the present disclosure is not limited to the examples, and various other portable devices may be employed. Furthermore, the liquid ejecting apparatus is not limited to the mobile printer and a stationary printer may be employed.

What is claimed is:

1. A mobile device configured to be coupled to a counterpart device, the mobile device comprising:
    a driving section configured to be driven by electric power;
    a coupling section configured to be coupled to the counterpart device; and
    an accommodation section configured to accommodate an all-solid-state battery, wherein
    when the counterpart device is coupled to the coupling section, the driving section is driven by electric power supplied from the counterpart device, and when the counterpart device is not coupled to the coupling section, the driving section is driven by electric power supplied from the all-solid-state battery, and
    the counterpart device includes an electrolyte battery including an electrolyte solution and does not include an all-solid-state battery.

2. The mobile device according to claim 1, further comprising:
    a charging section configured to, when the counterpart device is coupled to the coupling section, charge the all-solid-state battery by the electric power supplied from the counterpart device.

3. The mobile device according to claim 2, wherein
    when the driving section is driven, the charging section does not charge the all-solid-state battery, and when the driving section is not driven, the charging section charges the all-solid-state battery.

4. The mobile device according to claim 2, wherein
    the charging section charges the all-solid-state battery in a wireless manner.

5. The mobile device according to claim 1, further comprising:
    a storage section configured to store liquid inside the storage section, wherein
    the driving section makes, by being driven, a notification of an amount of liquid remaining in the storage section.

6. The mobile device according to claim 5, wherein
    the driving section includes a display section displaying information on the amount of liquid remaining in the storage section.

7. The mobile device according to claim 1, further comprising:
    a detection section configured to detect whether the counterpart device is coupled to the coupling section;
    a first switching section configured to perform switching between a conductive state and a blocking state of electric power from the counterpart device to the driving section;
    a second switching section configured to perform switching between a conductive state and a blocking state of electric power from the all-solid-state battery to the driving section; and
    a controller configured to control, based on a result of detection by the detection section, switching of the first switching section and switching of the second switching section.

8. The mobile device according to claim 7, wherein
    the first switching section is disposed in a path for supplying electric power from the counterpart device to the driving section without passing the all-solid-state battery.

9. A liquid storing cartridge configured to be coupled to a liquid ejecting apparatus ejecting liquid, the liquid storing cartridge comprising:
- a storage section configured to store liquid inside the storage section;
- a driving section configured to perform, by electric power, driving associated with the storage section;
- a coupling section configured to be coupled to the liquid ejecting apparatus; and
- an accommodation section configured to accommodate an all-solid-state battery, wherein
- when the liquid ejecting apparatus is coupled to the coupling section, the driving section is driven by electric power supplied from the liquid ejecting apparatus, and when the liquid ejecting apparatus is not coupled to the coupling section, the driving section is driven by electric power supplied from the all-solid-state battery, and
- the liquid ejecting apparatus includes an electrolyte battery including an electrolyte solution and does not include an all-solid-state battery.

\* \* \* \* \*